(12) United States Patent
Schmedes et al.

(10) Patent No.: US 9,453,929 B2
(45) Date of Patent: Sep. 27, 2016

(54) JOINT INVERSION WITH UNKNOWN LITHOLOGY

(75) Inventors: Jan Schmedes, Bellaire, TX (US); Christopher J. DiCaprio, Houston, TX (US); Charlie Jing, Houston, TX (US); Garrett M. Leahy, Kerrville, TX (US); Anoop A. Mullur, Houston, TX (US); Rebecca L. Saltzer, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 425 days.

(21) Appl. No.: 14/111,519

(22) PCT Filed: Mar. 9, 2012

(86) PCT No.: PCT/US2012/028541
§ 371 (c)(1),
(2), (4) Date: Oct. 11, 2013

(87) PCT Pub. No.: WO2012/166228
PCT Pub. Date: Dec. 6, 2012

(65) Prior Publication Data
US 2014/0180593 A1 Jun. 26, 2014

Related U.S. Application Data

(60) Provisional application No. 61/492,624, filed on Jun. 2, 2011.

(51) Int. Cl.
*G01V 1/28* (2006.01)
*G01V 3/38* (2006.01)
*G01V 11/00* (2006.01)

(52) U.S. Cl.
CPC .............. *G01V 1/282* (2013.01); *G01V 3/38* (2013.01); *G01V 11/00* (2013.01)

(58) Field of Classification Search
CPC ......... G01V 11/00; G01V 1/282; G01V 3/38

USPC ...... 702/2, 6, 7, 9, 11, 13, 14; 367/73; 703/2
See application file for complete search history.

(56) References Cited

U.S. PATENT DOCUMENTS 4,742,305 A 5/1988 Stolarczyk
4,792,761 A 12/1988 King et al.
(Continued)

FOREIGN PATENT DOCUMENTS

GB 2 402 745 8/2005
GB 2 410 635 12/2006
(Continued)

OTHER PUBLICATIONS

Abudakar, A. et al. (2010), "Joint electromagnetic and seiosmic data inversion algorithm for geophysical applications," American Geophysical Union, Fall Meeting 2010, Abstract #NS43A-02, 2 pgs.
(Continued)

*Primary Examiner* — John H Le
(74) *Attorney, Agent, or Firm* — ExxonMobil Upstream Research-Law Department

(57) ABSTRACT

Method for joint inversion of geophysical data to obtain 3-D models of geological parameters for subsurface regions of unknown lithology. Two or more data sets of independent geophysical data types are obtained, e.g. seismic and electromagnetic. Then they are jointly inverted, using structural coupling, to infer geophysical parameter volumes, e.g. acoustic velocity and resistivity. Regions of common lithology are next identified based on similar combinations of geophysical parameters. Then a joint inversion of the multiple data types is performed in which rock physics relations vary spatially in accordance with the now-known lithology, and 3-D models of geological properties such as shale content and fracture density are inferred. The computational grid for the last inversion may be defined by the lithology regions, resulting in average geological properties over such regions, which may then be perturbed to determine uncertainty in lithologic boundaries.

15 Claims, 7 Drawing Sheets

(56) References Cited

U.S. PATENT DOCUMENTS

| | | |
|---|---|---|
| 4,831,383 A | 5/1989 | Ohnishi et al. |
| 4,875,015 A | 10/1989 | Ward |
| 5,050,129 A | 9/1991 | Schultz |
| 5,175,500 A | 12/1992 | McNeill |
| 5,189,644 A | 2/1993 | Wood |
| 5,210,691 A | 5/1993 | Freedman et al. |
| 5,265,192 A | 11/1993 | McCormack |
| 5,357,893 A | 10/1994 | Ruffa |
| 5,373,443 A | 12/1994 | Lee et al. |
| 5,406,206 A | 4/1995 | Safinya et al. |
| 5,467,018 A | 11/1995 | Ruter et al. |
| 5,563,513 A | 10/1996 | Tasci et al. |
| 5,594,343 A | 1/1997 | Clark et al. |
| 5,706,194 A | 1/1998 | Neff et al. |
| 5,764,515 A | 6/1998 | Guerillot et al. |
| 5,770,945 A | 6/1998 | Constable |
| 5,825,188 A | 10/1998 | Montgomery et al. |
| 5,835,883 A | 11/1998 | Neff et al. |
| 5,836,634 A | 11/1998 | Finkelman |
| 5,841,733 A | 11/1998 | Bouyoucos et al. |
| 5,884,227 A | 3/1999 | Rabinovich et al. |
| 5,905,657 A | 5/1999 | Celniker |
| 6,037,776 A | 3/2000 | McGlone |
| 6,049,760 A | 4/2000 | Scott |
| 6,088,656 A | 7/2000 | Ramakrishnan et al. |
| 6,094,400 A | 7/2000 | Ikelle |
| 6,101,448 A | 8/2000 | Ikelle et al. |
| 6,115,670 A | 9/2000 | Druskin et al. |
| 6,138,075 A | 10/2000 | Yost |
| 6,181,138 B1 | 1/2001 | Hagiwara et al. |
| 6,253,100 B1 | 6/2001 | Zhdanov |
| 6,253,627 B1 | 7/2001 | Lee et al. |
| 6,256,587 B1 | 7/2001 | Jericevic et al. |
| 6,278,948 B1 | 8/2001 | Jorgensen et al. |
| 6,304,086 B1 | 10/2001 | Minerbo et al. |
| 6,311,132 B1 | 10/2001 | Rosenquist et al. |
| 6,332,109 B1 | 12/2001 | Sheard et al. |
| 6,339,333 B1 | 1/2002 | Kuo |
| 6,393,363 B1 | 5/2002 | Wilt et al. |
| 6,424,918 B1 | 7/2002 | Jorgensen et al. |
| 6,430,507 B1 | 8/2002 | Jorgensen et al. |
| 6,466,021 B1 | 10/2002 | MacEnany |
| 6,470,274 B1 | 10/2002 | Mollison et al. |
| 6,476,609 B1 | 11/2002 | Bittar |
| 6,493,632 B1 | 12/2002 | Mollison et al. |
| 6,502,037 B1 | 12/2002 | Jorgensen et al. |
| 6,529,833 B2 | 3/2003 | Fanini et al. |
| 6,533,627 B1 | 3/2003 | Ambs |
| 6,534,986 B2 | 3/2003 | Nichols |
| 6,593,746 B2 | 7/2003 | Stolarczyk |
| 6,594,584 B1 | 7/2003 | Omeragic et al. |
| 6,671,623 B1 | 12/2003 | Li |
| 6,675,097 B2 | 1/2004 | Routh et al. |
| 6,686,736 B2 | 2/2004 | Schoen et al. |
| 6,711,502 B2 | 3/2004 | Mollison et al. |
| 6,724,192 B1 | 4/2004 | McGlone |
| 6,739,165 B1 | 5/2004 | Strack |
| 6,765,383 B1 | 7/2004 | Barringer |
| 6,813,566 B2 | 11/2004 | Hartley |
| 6,816,787 B2 | 11/2004 | Ramamoorthy et al. |
| 6,842,006 B2 | 1/2005 | Conti et al. |
| 6,842,400 B2 | 1/2005 | Blanch et al. |
| 6,846,133 B2 | 1/2005 | Martin et al. |
| 6,876,725 B2 | 4/2005 | Rashid-Farrokhi et al. |
| 6,883,452 B1 | 4/2005 | Gieseke |
| 6,888,623 B2 | 5/2005 | Clements |
| 6,901,029 B2 | 5/2005 | Raillon et al. |
| 6,901,333 B2 | 5/2005 | Van Riel et al. |
| 6,914,433 B2 | 7/2005 | Wright et al. |
| 6,950,747 B2 | 9/2005 | Byerly |
| 6,957,708 B2 | 10/2005 | Chemali et al. |
| 6,958,610 B2 | 10/2005 | Gianzero |
| 6,985,403 B2 | 1/2006 | Nicholson |
| 6,993,433 B2 | 1/2006 | Chavarria et al. |
| 6,999,880 B2 | 2/2006 | Lee |
| 7,002,349 B2 | 2/2006 | Barringer |
| 7,002,350 B1 | 2/2006 | Barringer |
| 7,023,213 B2 | 4/2006 | Nichols |
| 7,039,525 B2 | 5/2006 | Mittet |
| 7,062,072 B2 | 6/2006 | Anxionnaz et al. |
| 7,092,315 B2 | 8/2006 | Olivier |
| 7,109,717 B2 | 9/2006 | Constable |
| 7,113,869 B2 | 9/2006 | Xue |
| 7,114,565 B2 | 10/2006 | Estes et al. |
| 7,116,108 B2 | 10/2006 | Constable |
| 7,126,338 B2 | 10/2006 | MacGregor et al. |
| 7,142,986 B2 | 11/2006 | Moran |
| 7,187,569 B2 | 3/2007 | Sinha et al. |
| 7,191,063 B2 | 3/2007 | Tompkins |
| 7,203,599 B1 | 4/2007 | Strack et al. |
| 7,227,363 B2 | 6/2007 | Gianzero et al. |
| 7,250,768 B2 | 7/2007 | Ritter et al. |
| 7,257,049 B1 | 8/2007 | Laws et al. |
| 7,262,399 B2 | 8/2007 | Hayashi et al. |
| 7,262,602 B2 | 8/2007 | Meyer |
| 7,307,424 B2 | 12/2007 | MacGregor et al. |
| 7,337,064 B2 | 2/2008 | MacGregor et al. |
| 7,347,271 B2 | 3/2008 | Ohmer et al. |
| 7,356,412 B2 | 4/2008 | Tompkins |
| 7,362,102 B2 | 4/2008 | Andreis |
| 7,382,135 B2 | 6/2008 | Li et al. |
| 7,400,977 B2 | 7/2008 | Alumbaugh et al. |
| 7,411,399 B2 | 8/2008 | Reddig et al. |
| 7,453,763 B2 | 11/2008 | Johnstad |
| 7,456,632 B2 | 11/2008 | Johnstad et al. |
| 7,477,160 B2 | 1/2009 | Lemenager et al. |
| 7,482,813 B2 | 1/2009 | Constable et al. |
| 7,502,690 B2 | 3/2009 | Thomsen et al. |
| 7,536,262 B2 | 5/2009 | Hornbostel et al. |
| 7,542,851 B2 | 6/2009 | Tompkins |
| 7,659,721 B2 | 2/2010 | MacGregor et al. |
| 7,660,188 B2 | 2/2010 | Meldahl |
| 7,683,625 B2 | 3/2010 | Milne et al. |
| 7,805,250 B2 | 9/2010 | Colombo et al. |
| 7,822,552 B2 | 10/2010 | Bittleston |
| 7,884,612 B2 | 2/2011 | Conti et al. |
| 7,928,732 B2 | 4/2011 | Nichols |
| 8,008,920 B2 | 8/2011 | Lu et al. |
| 8,099,239 B2 | 1/2012 | MacGregor et al. |
| 2002/0172329 A1 | 11/2002 | Rashid-Farrokhi et al. |
| 2005/0128874 A1 | 6/2005 | Herkenhoff et al. |
| 2005/0237063 A1 | 10/2005 | Wright et al. |
| 2006/0186887 A1 | 8/2006 | Strack et al. |
| 2007/0280047 A1 | 12/2007 | MacGregor et al. |
| 2007/0285274 A1 | 12/2007 | Esmersoy |
| 2007/0288211 A1 | 12/2007 | MacGregor et al. |
| 2008/0007265 A1 | 1/2008 | Milne et al. |
| 2008/0008920 A1 | 1/2008 | Alexandrovichserov et al. |
| 2008/0015782 A1 | 1/2008 | Saltzer et al. |
| 2008/0105425 A1 | 5/2008 | MacGregor et al. |
| 2008/0106265 A1 | 5/2008 | Campbell |
| 2009/0005997 A1 | 1/2009 | Willen |
| 2009/0070042 A1 | 3/2009 | Birchwood et al. |
| 2009/0187391 A1 | 7/2009 | Wendt et al. |
| 2009/0204330 A1 | 8/2009 | Thomsen et al. |
| 2009/0243613 A1 | 10/2009 | Lu et al. |
| 2009/0306900 A1 | 12/2009 | Jing et al. |
| 2009/0309599 A1 | 12/2009 | Ziolkowski |
| 2010/0179761 A1 | 7/2010 | Burtz et al. |
| 2010/0185422 A1 | 7/2010 | Hoversten |
| 2011/0015907 A1 | 1/2011 | Crawford et al. |
| 2013/0116927 A1 | 5/2013 | DiCaprio et al. |

FOREIGN PATENT DOCUMENTS

| | | |
|---|---|---|
| WO | WO 98/07050 | 2/1998 |
| WO | WO 2004/109338 | 12/2004 |
| WO | WO 2006/052145 | 5/2006 |
| WO | WO 2006/073115 | 7/2006 |
| WO | WO 2008/054880 | 5/2008 |
| WO | WO 2008/062024 | 5/2008 |
| WO | WO 2010/036482 | 4/2010 |
| WO | WO 2010/080366 | 7/2010 |

OTHER PUBLICATIONS

(56) References Cited

OTHER PUBLICATIONS

Buland, A. et al. (2008), "Bayesian lithology and fluid prediction from seismic prestack data," *Geophysics* 73(3), pp. C13-C21.

Doetsch, J. et al. (2010), Zonation for 3D aquifer characterization based on joint inversions of multi method crosshole geophysical data, *Geophysics* 75(6), pp. 53-64.

Farquharson, C.G. et al. (2010), "Joint inversion of seismic traveltimes and gravity data on unstructured grids with application to mineral explortation," AGU Fall Meeting 2010, NS43A-05, 2 pgs.

Gallardo, L.A. et al. (2003), "Characterization of heterogeneous near-surface materials by joint 2D inversion of DC resistivity and seismic data," *Geophysical Research Letters* 30(13), 1658, pp. I-1, I-4.

Gallardo, L.A. et al. (2004), "Joint two-dimensional DC resistivity and seismic travel time inversion with cross-gradient constraints," *Journal of Geophysical Research* 109, B03311, 11 pgs.

Guillen, A. et al. (2004), "Constrained gravity 3D litho-inversion applied to Broken Hill," ASEG 17th Geophsisical Conference and Exhibition, Sydney, 6 pgs.

Haber, E. et al. (1997), "Joint inversion: a structural approach," *Inverse Problems* 13, pp. 63-77.

MacQueen, J. (1967), Some Methods for classification and Analysis of Multivariate Observations, Proceedings of 5th Berkeley Symposium on Mathematical Statistics and Probability, Berkeley, *University of California Press* 1, pp. 281-297.

Mataracioglu, M. et al. (2010), "Effectivness of joint inversion for mine survey," 2010 AGU Fall Meeting, NS41B-1509.

Sarle, W.S. (1994), Neural networks and statistical models, Proceedings of the Nineteenth Annual SAS Users Group International Conference, Apr. 1-13.

Specht, D.F.(1990), "Probabilistic neural networks," *Neural Networks* 3, 109-118.

Step 1: Joint Inversion with Structural Coupling

Step 2: Determine Lithology Volume

Step 3: Joint Inversion Using Rock Physics

| Lithology | Density | Resistivity | Velocity |
|---|---|---|---|
| Basalt | High | High (unless heavily fractured) | High |
| Salt | Low | Low (unless massive without fractures) | High |
| Clastics | Intermediate | Low (unless hydrocarbon filled) | Low |
| Carbonate | Intermediate | High (depending on dolomitization) | High |

JOINT INVERSION WITH UNKNOWN LITHOLOGY

CROSS-REFERENCE TO RELATED APPLICATION

This application is the National Stage entry under 35 U.S.C. 371 of PCT/US2012/028541 that published as WO 2012/166228 and was filed on 9 Mar. 2012, which claims the benefit of U.S. Provisional Application No. 61/492,624, filed on 2 Jun. 2011, entitled JOINT INVERSION WITH UNKNOWN LITHOLOGY, the entirety of which is incorporated by reference herein.

FIELD OF THE INVENTION

This invention relates generally to the field of geophysical prospecting and, more particularly, to joint inversion of two or more different types of geophysical data to infer physical property models of the subsurface. Specifically, the invention is a method for inferring lithology as well as geologic properties in the joint inversion.

BACKGROUND OF THE INVENTION

This invention pertains to using geophysical data in a joint inversion to infer geological properties of the subsurface. During an inversion, the aim is to minimize the difference between the measured data and the data predicted by the inversion model. In order to perform a predicted data calculation, geophysical parameters such as seismic velocity (or elastic coefficients), or electrical conductivity must be known. When multiple data types (e.g. reflection seismic and electromagnetic data) are inverted simultaneously, it is known as a joint inversion. Geophysical data are likely to include active seismic reflection data; active seismic refraction data; electromagnetic data (either controlled source or magneto-telluric); and/or gravity measurements; however, it may in addition include any other type of data that can be used to infer the properties of subsurface rocks in the region of interest.

Geophysical properties, such as elastic coefficients, density, and electrical conductivity, can be converted to the geological properties of interest in hydrocarbon exploration (e.g., porosity and fluid type) via rock physics relationships (obtained empirically or theoretically). In this way the different geophysical data types are linked in the joint inversion. These rock physics relationships can be embedded in a joint inversion of geophysical data. They are used to calculate the needed geophysical parameters (elastic coefficients, electrical conductivities, and density) that are necessary for forward calculating the predicted data. Using the forward predicted data, a misfit between the predicted and observed data is computed. The model is then iteratively updated using some optimization scheme to minimize the difference between predicted and measured data.

In general, to perform joint inversions of this type, one must assume a priori a particular rock physics relationship between the geophysical parameters (for example sonic velocity, shear wave velocity, density or conductivity) that predict the data and the geological parameters (for example porosity or water saturation) of interest. By assuming a rock physics relationship we are assuming a lithology and depositional environment present in the subsurface. A lithologic class is a rock type that is considered to possess unifying rock physics behavior for the purposes of the inversion; e.g., clastics and carbonates might be considered two distinct lithologic classes, each with their own rock physics relationship. However, the lithology in the subsurface of a particular region of interest is often not known beforehand, and further, a single physical volume sampled by the data may contain more than one lithology with an unknown spatial distribution of those lithologies.

One way to jointly invert multiple geophysical data for geophysical properties is to assume structural coupling (e.g., Haber and Oldenburg, 1997) where anomalies in one of the geophysical properties (e.g., velocity) are required to occur in the same location as anomalies in one or more of the other geophysical properties (e.g., resistivity). The problem with this approach is that it is highly nonlinear, when data of very different resolutions are being inverted. This makes it practically challenging to invert, for example, high frequency seismic data together with low frequency CSEM data.

A joint inversion for geophysical properties can also be performed by assuming explicit or implicit relationships between the parameters. For example two parameters can be assumed to be correlated (see for example Farquharson et al., 2010). The problem with this approach is that these relationships have to be known beforehand and must be adequate for the subsurface area of interest, or the inversion will fail.

In order to infer geological properties from an inversion for geophysical properties, a rock physics model can be used to convert the inverted geophysical properties into geological properties. Even though this approach allows one to infer geological properties, it relies on the inverted geophysical properties. The conversion does not rely on the measured data and thus does not allow for feedback between measured data and geological properties.

Doetsch et al. (2010) perform a joint inversion using structural coupling. Following the inversion, they analyze the inverted geophysical properties for patterns of similar properties, such as zones that are fast and resistive versus zones that are slow and conductive. These zones of similar geophysical properties are then treated as one model cell and they invert for average geophysical properties for each zone. In the next step they use the average properties to do an after-the-fact conversion to the average geological properties, using rock-physics relationships. The problem with this approach is that it relies on the data being of similar resolution due to the structural coupling. Furthermore, as described before, there is no feedback between the inferred average geological properties and the measured data. In general applications, therefore, this method may not succeed.

Another approach to joint inversion uses statistical methods. A lithology in these methods is simply defined as a class of rocks that can be assigned a probability density function ("pdf") of continuous parameters (e.g. seismic p-wave velocity, or porosity)—no explicit rock physics equations are necessary. The use of the statistical method is, for example, demonstrated by Guillen et al (2004) who use gravity and magnetic data to invert for lithology of the subsurface; Buland et al. (2008) use a similar technique to invert for seismic reflection data. Unfortunately, this approach assumes that the pdf for each lithology is known beforehand, which is rarely the case for most exploration settings.

In another approach for joint inversion, the geologic environment is assumed known and the corresponding rock physics model is applied (see Abubakar et al., 2010; Jing et al., 2010; Hoversten, 2010). For example, if the lithology is assumed to be clastic, a clastic rock physics model is used to relate the velocity, density and resistivity to the rock properties (e.g., Vshale, porosity, Water saturation). This has the advantage that the geological parameters are inverted for directly, i.e., this approach allows for feedback between geologic parameters and the measured data. But unless the lithology is known beforehand, the assumption of a specific rock physics model can strongly bias the inverted result. For example, in the event the lithology is in fact a volcanic, such as basalt, and not clastic, the estimates of velocity and density will be incorrect and the characterization of rock in terms of Vshale will not make sense. That is, unless the lithology is known beforehand, the assumption of a specific rock physics model can strongly bias the inverted result, leading to incorrect results.

DiCaprio et al. (2010) present an approach that allows jointly inverting geophysical data for subsurface properties in cases where the lithology class is not known beforehand. Instead of assigning a rock type a priori, their invention prescribes using the lithology classes as a discrete inversion parameter to be found during the inversion. At each step in the inversion, the appropriate rock physics relationship is used on the resolution cells depending on what lithology they are currently assigned. The lithology parameter is allowed to vary both as the inversion evolves and as a function of space (allowing for mixed lithologies in a single physical volume). A drawback of this approach is that specialized optimization schemes must be used, and the model space is greatly expanded. This may not be computationally practical for all applications.

The invention presented here is an alternative approach to DiCaprio et al. (2010). It also allows for the inversion of geological properties in cases where the lithology is unknown. There is no restriction to use data of similar resolution. Instead of one inversion with additional parameters to be inverted for (DiCaprio et al, 2010), it uses different data coupling strategies in different stages of the inversion to arrive at a model of geological properties and lithologies.

SUMMARY OF THE INVENTION

In one embodiment, the invention is a computer-implemented method for joint inversion of two or more sets of geophysical data of different types, measured in surveys of a subsurface region, to obtain a model of at least one geological property for the subsurface region, said method comprising:

using a computer to jointly invert the sets of geophysical data, using structural coupling between the different data types, to obtain models of geophysical properties corresponding to the sets of geophysical data, said structural coupling being determined from the geophysical data or from a priori knowledge of the subsurface region;

partitioning the subsurface region into sub-regions based on similar combinations of geophysical parameters in the geophysical property models that correlate to particular lithologies, thereby defining lithology sub-regions;

determining mathematical rock physics relationships appropriate for each lithology, said rock physics relationships relating geological properties to geophysical properties; and using a computer to jointly invert the sets of geophysical data, using the rock physics relationships according to lithology sub-region, to obtain a model of one or more of the geological properties for the subsurface region.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it must be performed on a computer, typically a suitably programmed digital computer.

DETAILED DESCRIPTION OF EXAMPLE EMBODIMENTS

Figure 1:
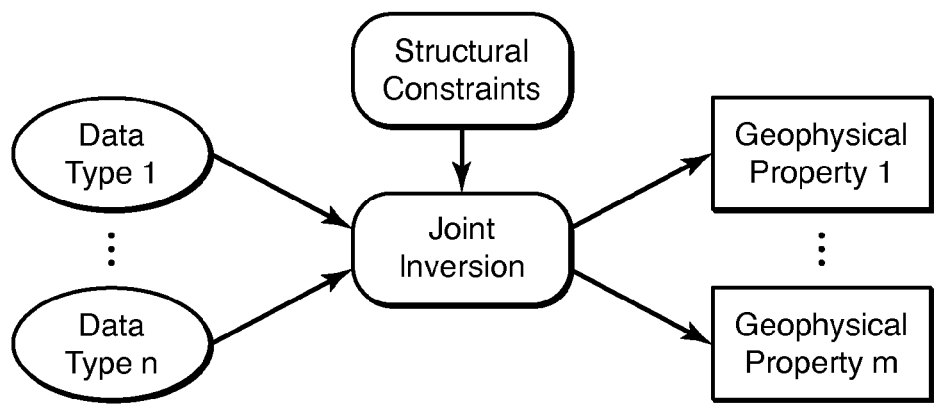
FIG. 1 is a flowchart showing basic steps in one embodiment of the present inventive method.
Figure 1:
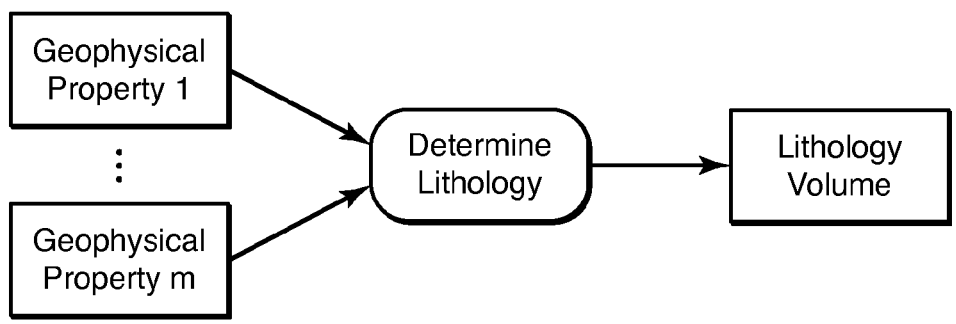
Figure 1:
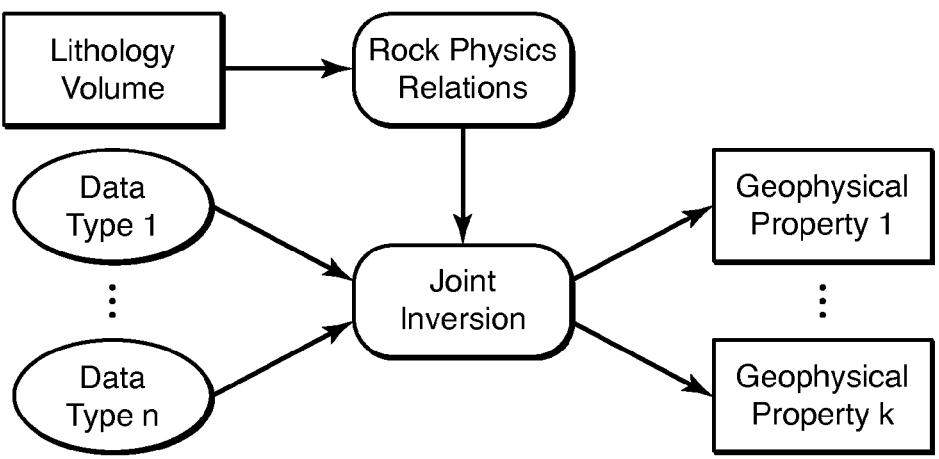

This invention is a method for a rock physics based joint inversion of geophysical data for subsurface properties in cases where the lithology class—also referred to as rock type or facies—is not known beforehand. This is done in a workflow (FIGS. 1 and 2), in which the coupling strategies may change at each step. FIG. 1 is a flowchart showing basic steps in one embodiment of the present inventive method.

In step 1, a structural coupling method, for example Haber and Oldenburg (1997), is used to jointly invert the geophysical data of at least two data types. In structural coupling the sole assumption is that the inverted geophysical properties, for example sonic velocity and conductivity, have structural similarity, i.e. boundaries and changes in the properties are co-located ("structural constraints"). The result of a joint inversion using structural coupling is geophysical properties, e.g. sonic velocity, density, conductivity. The term structural coupling is used herein to mean include all forms of coupling that would make the inversion joint and that could be used without knowledge of lithology. It also includes additional constraints that might be interpreted from the data as well as come from previous knowledge, such as known boundaries that can be enforced in the inverted geophysical parameters.

In step 2, the lithology is determined by identifying zones that have similar geophysical properties, for example zones that have a large sonic velocity and a small conductivity as opposed to small sonic velocity and high conductivity. Once these zones are identified, the lithology of each zone ("lithology volume") can be determined and an appropriate rock physics relation is assigned.

In step 3, a joint inversion using rock physics coupling is performed. In this approach the rock physics relations are embedded in the joint inversion of the different data types for a common set of geological properties or parameters (see, for example, Jing et al. 2010).

Figures 2, 3:
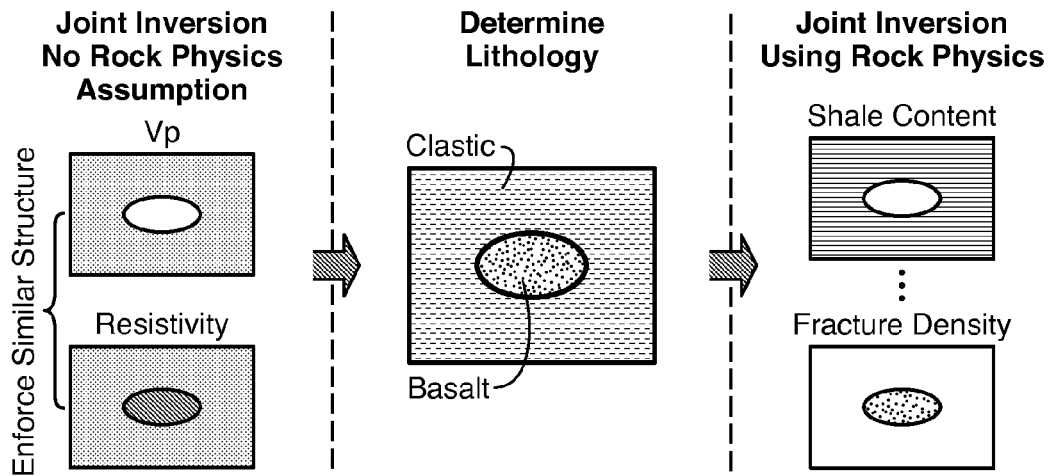
FIG. 2 is a schematic diagram illustrating how the method of FIG. 1 works for a case of mixed lithologies (clastic and basalt)
FIG. 3 is a table of lithologies commonly encountered in hydrocarbon exploration.

FIG. 2 is a schematic diagram illustrating how the method of FIG. 1 works for a case of mixed lithologies (clastic and basalt).

Note, that the first two steps of the workflow are similar to Doetsch et al. (2010) with the exception that the present invention uses the resulting lithology zones to assign a rock physics model, while Doetsch et al. invert for average geophysical properties of each zone. Doetsch et al. (2010) use the average properties to do an after-the-fact conversion to the average geological properties, while the current invention performs a rigorous joint inversion using rock physics to couple the different geophysical data. Another key difference is that Doetsch et al (2010) determine only average geological properties for each zone, while the present joint inversion method yields geological properties at the employed grid spacing.

In frontier hydrocarbon exploration the broad lithology classes of the rocks are often not known; in this case, possible lithologies for the inversion may be clastic, carbonate, salt, and basalt. The particular possible lithologies chosen will be based on prior geological knowledge of the area. The data sets collected must be able to distinguish among the chosen lithologies. FIG. 3 demonstrates how a combination of different data types can allow distinguishing among several possible lithologies in step 2 of FIG. 1.

Figure 4:
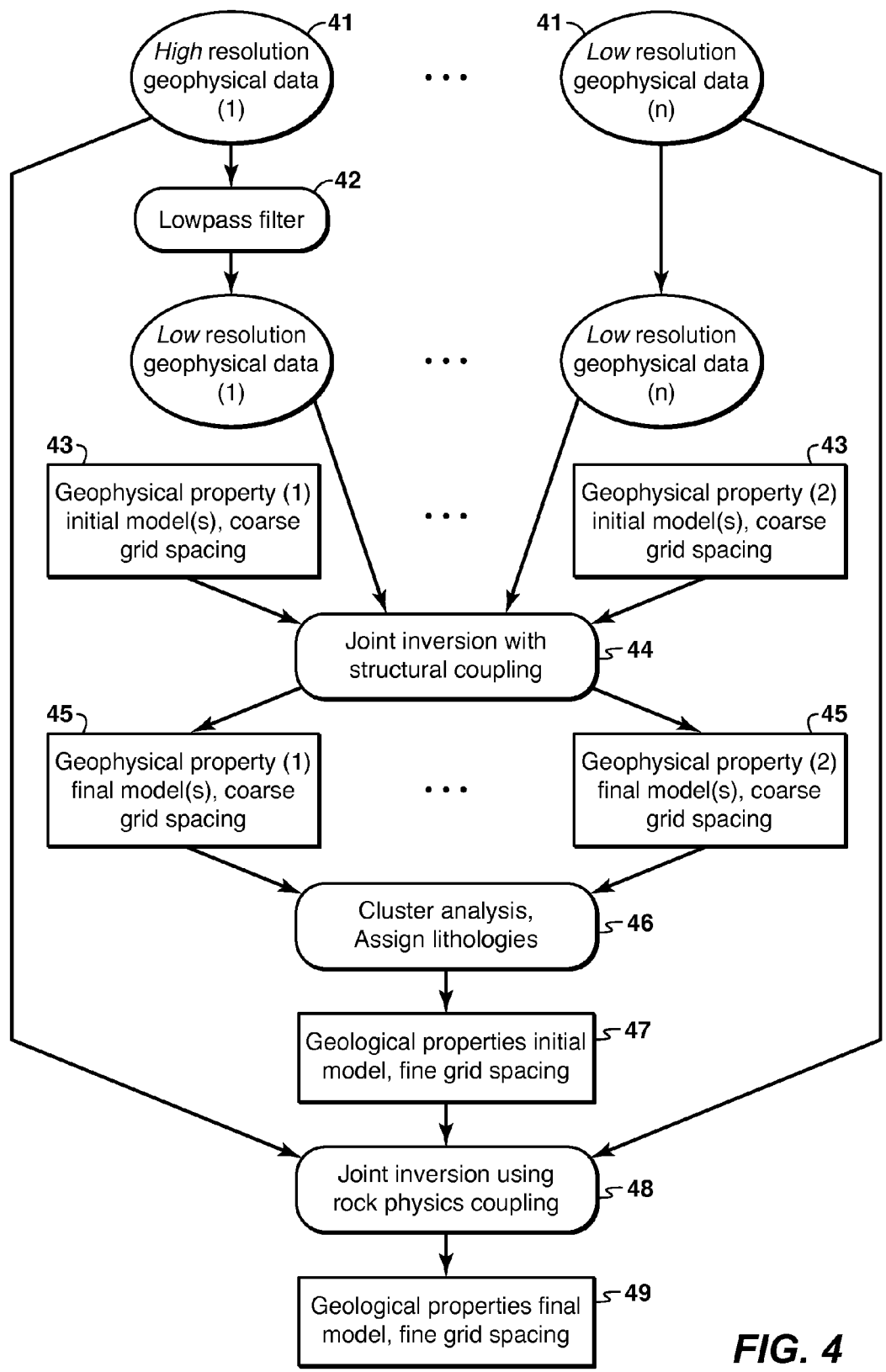
FIG. 4 is a flowchart showing basic steps in one embodiment of the present inventive method.

FIG. 4 is a flowchart showing, in more detail, steps in a particular embodiment of the present inventive method.

In step 41, geophysical data are collected. The data set might include collecting two or more of active seismic reflection and/or active seismic refraction, controlled source electromagnetic, MT, and gravity data over a region of interest.

Because structural coupling becomes highly nonlinear if data types of very different resolution are combined, a low pass filter may be applied to the high frequency data types (step 42), for example seismic reflection data. This decreases the resolution of these data types and gives more stable structural coupling. Furthermore, the filtering may mitigate the local minima problem associated with the inversion of seismic reflection data.

In step 43, the subsurface is discretized into inversion grid cells. Because only low frequencies are used in this step, it is possible to use a coarser grid than if all frequencies would be considered. This gives an additional advantage of reduced computation time for this step. Furthermore, an initial guess for the geophysical properties in each grid cell is created using any prior information available.

In step 44, a cross gradient approach, for example, may be used to couple the different data in a joint inversion. The so called cross gradient constraint, which is a form of structural coupling, is added to the objective function (e.g. Gallardo and Meju (2003, 2004)). This constraint tries to co-locate changes in each of the model parameters independent of their magnitude. The result of the inversion will be geophysical property volumes 45.

In step 46, clusters/zones with similar combinations of geophysical parameters, such as fast sonic velocity, high density, and high resistivity are identified. Some type of cluster analysis (e.g. MacQueen (1967), Kaufman and Rous-seeuw (2005), Doetsch et al. (2010)) or pattern recognition (e.g. Specht (1990), Sarle (1994)) may be used to identify these zones with similar geophysical properties.

Next in step 46, a finite set of lithologic classes (e.g. basalt, salt, clastic, and carbonate) is picked. Each class has a corresponding set of equations that relate the geophysical properties (e.g., velocity, density, conductivity) to the geological properties (e.g., porosity, lithology, fluid type).

Finally in step 46, each zone of similar geophysical properties is assigned a lithology—a basalt, for example; rock physics equations associated with each lithology are chosen. This can be done as an interpretation step, using a data base (e.g. FIG. 3), or using some more rigorous mathematical approach that assesses which rock physics relation predicts the geophysical properties best.

Once the rock physics relations are assigned, the subsurface is discretized in step 47 into inversion grid cells at the desired scale length appropriate for an inversion utilizing all available frequencies. An initial guess for the geological properties is constructed also in step 47 using the geophysical properties inverted in step 44 together with the rock physics equations assigned in step 46.

In step 48, a joint inversion using rock physics is performed (see, for example, Jing et al., 2010). Each zone gets assigned the rock physics relationship of the lithology determined in step 46. The data sets are now coupled using rock physics relationship and for each zone the inversion is performed for a common set of geological parameters. The inversion may be performed using the full resolution of all data and the desired grid spacing.

During the joint inversion, the aim is to minimize the difference between the measured data and the data predicted by the inversion model. In order to perform a predicted data calculation, geophysical parameters such as seismic velocity (or elastic coefficients), and electrical conductivity must be known. Using the geologic parameters from the current geological properties model as input quantities, the rock physics models assigned to each zone are used to calculate the needed geophysical parameters such as elastic coefficients, electrical conductivities, and densities that are necessary for forward calculating the predicted data. Using the forward predicted data, a misfit between the predicted and observed data is computed. The model is iteratively updated using any one of a number of optimization schemes. In determining the update, damping terms and lithologic/rock physics constraints may be included in the objective function. This total objective function (misfit and additional terms) is to be minimized in the inversion, resulting in best estimates of the geological properties. The constraints are non-deterministic parts of the rock physics model that help to restrict solutions to geologically realistic combinations of parameters. For example, in a cell with a clastic lithology, porosity and Vclay might be expected to be inversely correlated, so a term could be added to the objective function that penalizes solutions that do not follow this trend.

When the optimization process has converged on a model, a possible solution 49 to the inverse problem in the geological property space has been found.

There may be circumstances in which the values of any continuous inversion parameters are not of interest and only lithologic packages and their average geological parameters are to be found. In this case, illustrated by the flowchart of FIG. 5, the joint inversion using structural coupling and the cluster analysis may be performed as described. But instead of performing the inversion on a fine grid, each cluster is treated as one inversion cell at step 57, and the inversion is performed at step 58 for just the average geological properties of each cluster 59. This is similar to the approach by Doetsch et al. (2010) with the main difference that Doetsch et al. (2010) invert for average geophysical properties and then do a conversion to the geological properties, while the present invention assigns a rock physics model to each zone and performs a rigorous inversion of all geophysical data types for the average geological properties, i.e., the present inventive method allows for feedback between data and geological parameters.

Figure 5:
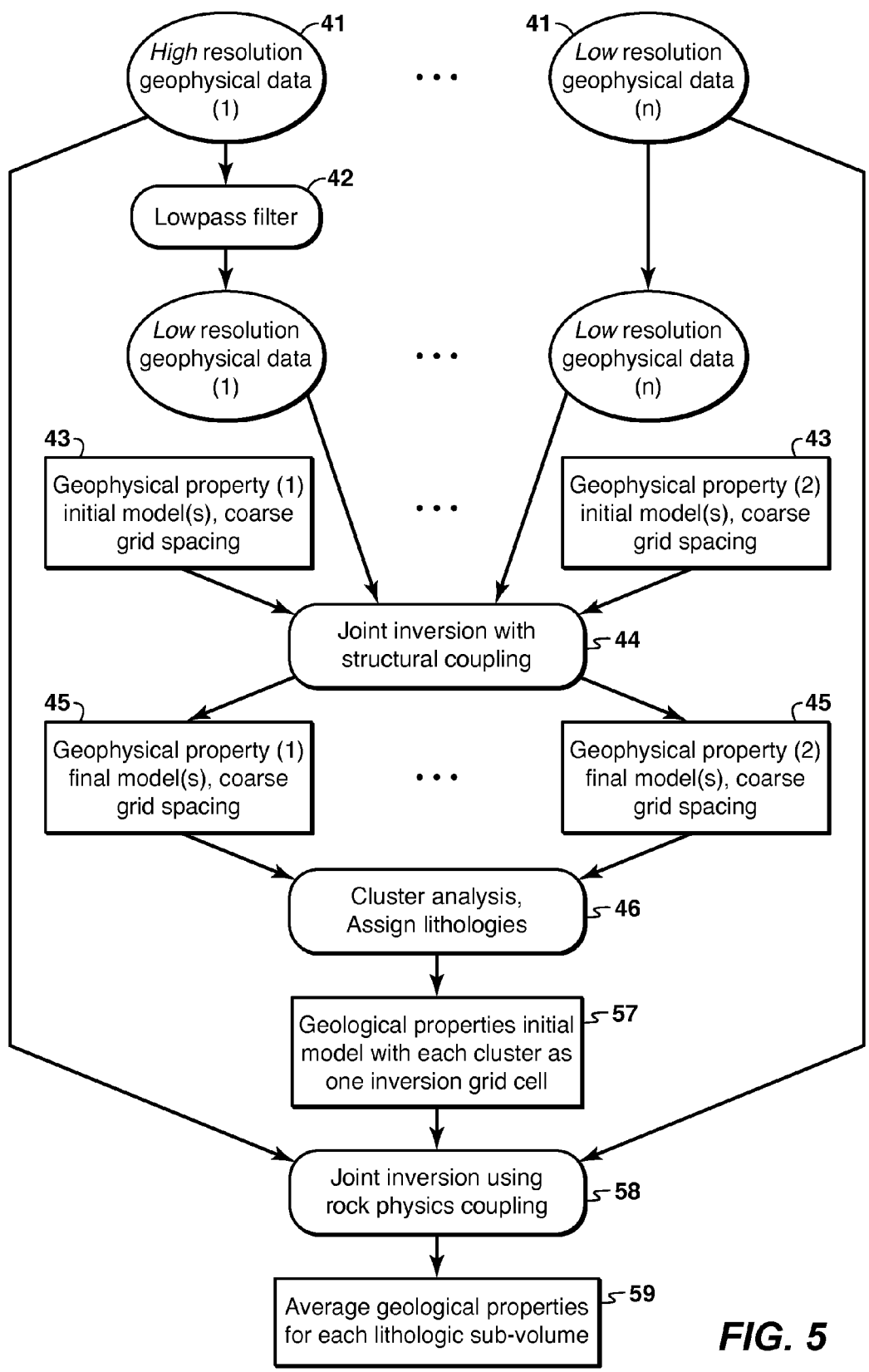
FIG. 5 is a flowchart showing basic steps in an embodiment of the present inventive method for determining average geological properties for lithologic units.
Figure 6:
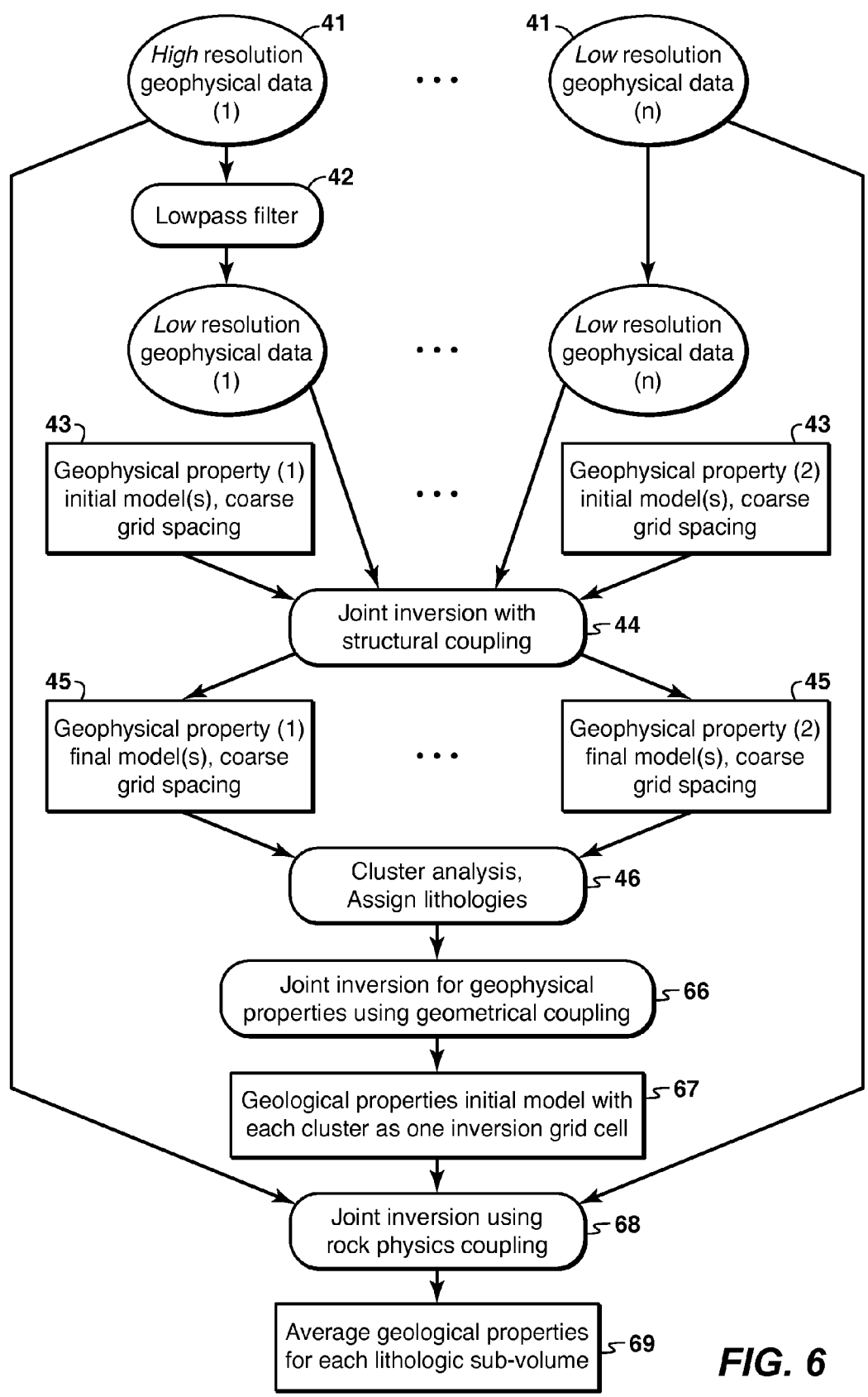
FIG. 6 is a flowchart showing basic steps in the embodiment of FIG. 5 modified with an additional step of geometric coupling.

The embodiment of FIG. 5 may be used with an additional step before the inversion of the average geological parameters, as shown in the flowchart of FIG. 6. The purpose of this intermediate step is to provide a better starting model for the iterative joint inversion using rock physics coupling (58, 68) by allowing the cluster boundaries to change to account for the fact that each cell gets assigned only average geophysical properties. In this intermediate step 66, after the clusters are identified in step 46, the average geophysical parameters are inverted for each cluster, and the coupling of the data is accomplished by performing that inversion for a common geometry of all geophysical parameters, for example the thickness of each cluster. In other words, the thickness of each cluster is an additional unknown, in addition to the average geophysical parameters for each cluster, that is inferred in the inversion of step 66. Since the cluster thickness applies to each data type, this provides the coupling that makes the inversion "joint" rather than sequential. This is similar to, and serves the same "jointness" purpose as, the structural coupling in step 44; however, the various types of geometrical coupling would not be known at the outset, i.e. at the stage of step 44. Using a common geometry to couple different data is described in Mataracioglu and Asci (2010), who jointly invert different geophysical data for the location of an ore body. The resulting new geometry 67 is then used in step 68 to invert the average geological parameters 69. In other words, the average geophysical parameters resulting from step 66 are substituted into the appropriate rock physics relationships to yield average geological properties for a starting model for the iterative joint inversion in step 68, and the better defined clusters (locations of the cluster boundaries are better known) that are also inferred in step 66 define the grid cells for the inversion of step 68.

Figure 7:
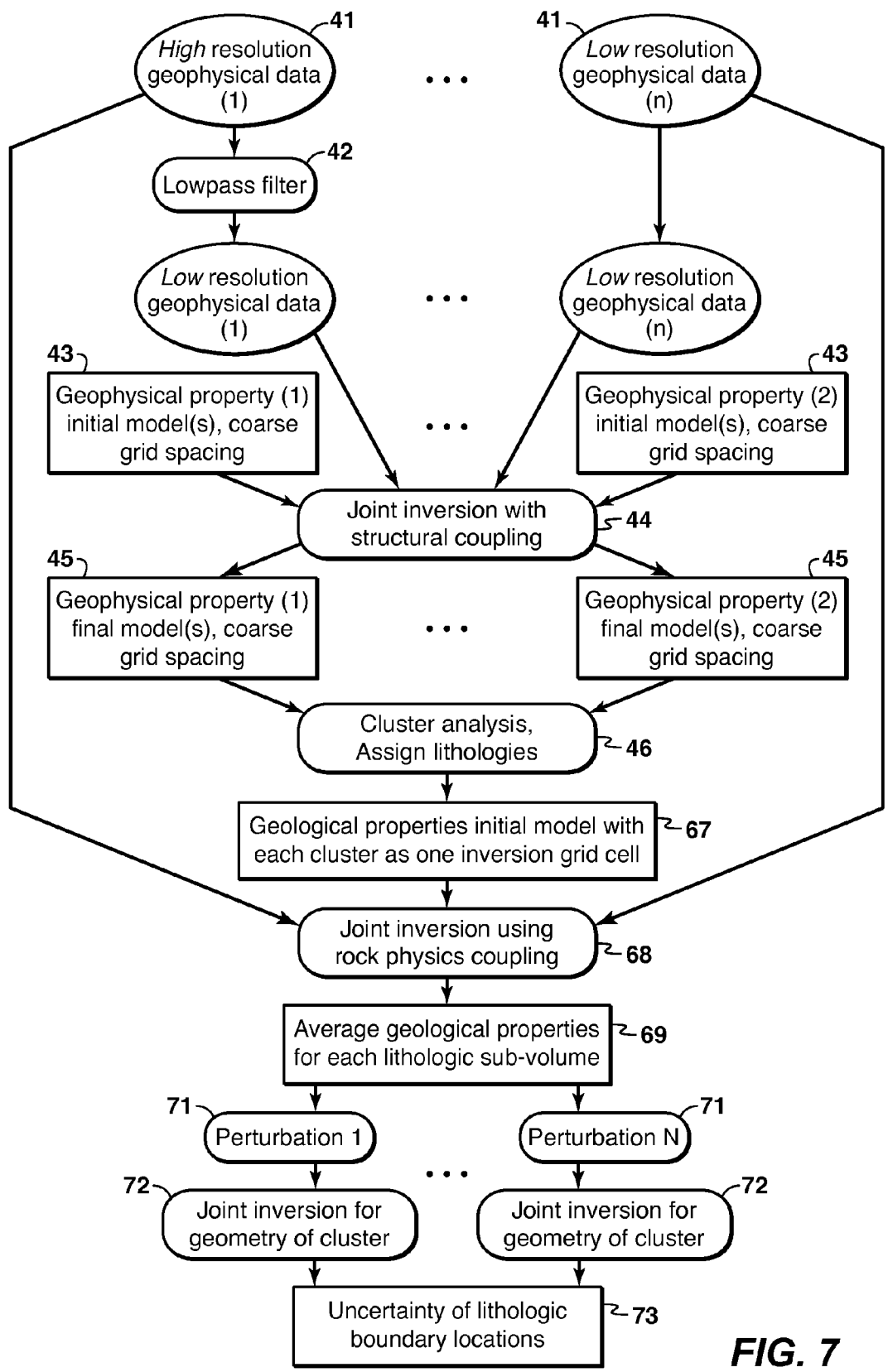
FIG. 7 is a flowchart showing basic steps in the embodiment of FIG. 6 modified to assess uncertainties of the locations of the lithologic boundaries.

Once the average geological properties for each cluster are determined using one of the embodiments of the invention such as those illustrated in FIGS. 5 and 6, they can be perturbed at step 71 in FIG. 7, and an inversion for the common geometry can be performed at step 72 for different perturbations. This can be used to infer the possible range of thicknesses of lithologic units. This does not provide estimates of uncertainty of the geological properties, as for example obtained by a stochastic inversion (Hoversten, 2010), but instead provides uncertainties related to the geometry of a lithological unit 73.

Figure 8:
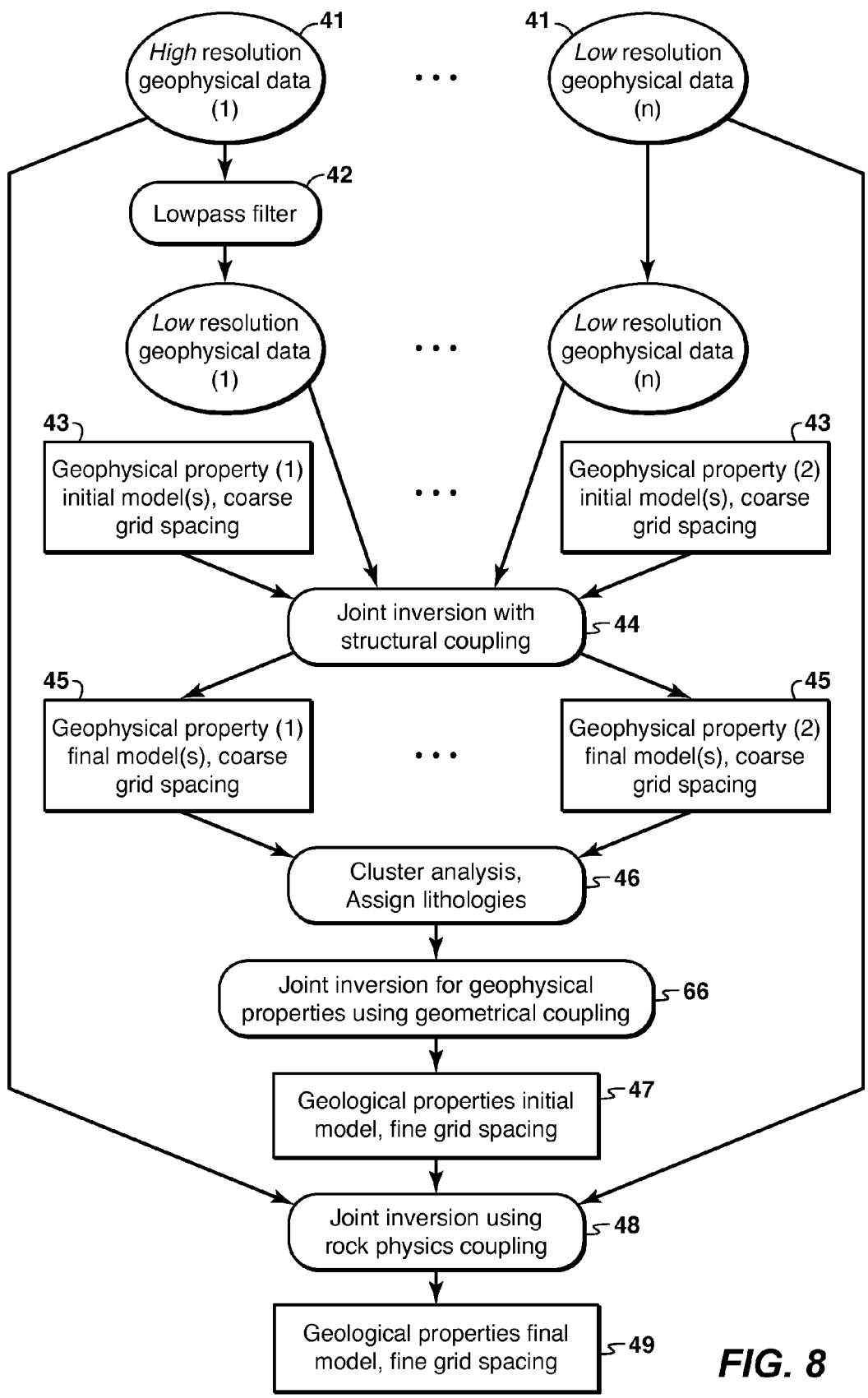
FIG. 8 is a flowchart showing how the method of FIG. 4 may be modified to add an additional intermediate step of geometric coupling.

The embodiment of the invention illustrated in FIG. 4, with the additional intermediate step outlined earlier (step 66 in FIG. 6), during which the data are coupled by inverting for a common geometry of the identified zones/cluster, is outlined in FIG. 8.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Abubakar, A., Gao, G., Habashy, T., Liu, J., "Joint electromagnetic and seiosmic data inversion algorithm for geophysical applications," American Geophysical Union, Fall Meeting 2010, Abstract #NS43A-02 (2010).

Buland, A., Kolbjornsen, O., Hauge, R., Skjaeveland, O., and Duffaut, K., "Bayesian lithology and fluid prediction from seismic prestack data,"*Geophysics* 73(3), pp. C13-C21 (2008).

DiCaprio, C., Saltzer, R., Mullur, A., "Inverting geophysical data for geological parameters or lithology," U.S. Provisional Patent Ser. No. 61/368,035.

Doetsch J., Linde, N., Coscia, I., Greenhalgh, S. A., Green, A. G., "Zonation for 3D aquifer characterization based on joint inversions of multi method crosshole geophysical data," *Geophysics* 75(6), 53-64 (2010).

Farquharson, C. G., Leviere, P. G., Hurich, C. A., "Joint inversion of seismic traveltimes and gravity data on unstructured grids with application to mineral exploration," AGU Fall Meeting 2010, NS43A-05 (2010).

Gallardo, L. A and M. A. Meju, "Characterization of heterogeneous near-surface materials by joint 2D inversion of DC resistivity and seismic data," *Geophysical Research Letters* 30, 1658 (2003).

Gallardo, L. A and M. A. Meju, "Joint two-dimensional DC resistivity and seismic travel time inversion with cross-gradient constraints," *Journal of Geophysical Research* 109, B03311 (2004).

Guillen, A., Courrioux, G., Calcagno, P., Lane, R., Lees, T., McInerney, P., "Constrained gravity 3D litho-inversion applied to Broken Hill," ASEG 17$^{th}$ Geophsisical Conference and Exhibition, Sydney (2004).

Haber, E and Oldenburg D, "Joint inversion: a structural approach," *Inverse Problems* 13, 63-77 (1997).

Hoversten G. M., "Stochastic inversion of geophysical data for estimating earth model parameters," U.S. Patent Application Publication US2010-0185422 (2010).

Jing, C., Carazzone, J. J., Rumpfhuber, E. M., Saltzer, R. L., Dickens, T. A., Mullur, A. A., "Hydrocarbon detection with passive seismic data," PCT Patent Publication No. WO2010-080366 (2010).

MacQueen, J., "Some Methods for classification and Analysis of Multivariate Observations," Proceedings of 5th Berkeley Symposium on Mathematical Statistics and Probability, Berkeley, *University of California Press,* 1:281-297 (1967).

Mataracioglu M., and M. Asci, "Effectiveness of joint inversion for mine survey," 2010 AGU Fall Meeting, NS41B-1509 (2010).

Sarle, W. S., "Neural networks and statistical models," Proceedings of the Nineteenth Annual SAS Users Group International Conference, Apr. 1-13 (1994).

Specht, D. F., "Probabilistic neural networks," *Neural Networks* 3, 109-118 (1990).

The invention claimed is:

1. A computer-implemented method for joint inversion of two or more sets of geophysical data of different types, measured in surveys of a subsurface region, to obtain a model of at least one geological property for the subsurface region, said method comprising:

using a computer to jointly invert the sets of geophysical data, using structural coupling between the different data types, to obtain models of geophysical properties corresponding to the sets of geophysical data, said structural coupling being determined from the geophysical data or from a priori knowledge of the subsurface region;

partitioning the subsurface region into sub-regions based on similar combinations of geophysical parameters in the geophysical property models that correlate to particular lithologies, thereby defining lithology sub-regions;

determining mathematical rock physics relationships appropriate for each lithology, said rock physics relationships relating geological properties to geophysical properties; and using a computer to jointly invert the sets of geophysical data, using the rock physics relationships according to lithology sub-region, to obtain a model of one or more of the geological properties for the subsurface region, wherein at least one of the sets of geophysical data are filtered using a low-pass filter before the jointly inverting with structural coupling, which inverting uses a computational grid with coarseness of scale consistent with frequency content passed by the low-pass filter.

2. The method of claim 1, wherein the two or more different types of geophysical data are two or more of a group consisting of: seismic reflection data, seismic refraction data, controlled source electromagnetic data, magnetotelluric data, gravity data, and magnetic data.

3. The method of claim 1, wherein assigning a lithology to each sub-region is implemented using at least one of a group consisting of: a database correlating lithology to geophysical properties; a neural network; statistical cluster analysis; and pattern recognition.

4. The method of claim 1, wherein an initial geological properties model for the joint inversion using rock physics relationships is developed using the models of geophysical properties obtained from the joint inversion with structural coupling, substituted into the rock physics relationships.

5. The method of claim 1, wherein a geological properties model to constrain inversion for the joint inversion using rock physics relationships is developed using the models of geophysical properties obtained from the joint inversion with structural coupling, substituted into the rock physics relationships.

6. The method of claim 5, further comprising using the models of geophysical properties obtained from the joint inversion with structural coupling as additional constraint on the joint inversion using rock physics relationships.

7. The method of claim 1, wherein in the joint inverting using rock physics relationships, each lithology sub-region is treated as a single cell in a computational grid, and the geological properties obtained are average properties over each lithology sub-region.

8. The method of claim 7, further comprising generating a plurality of perturbations of the average properties and then for each perturbation performing a joint inversion of the sets of geophysical data using geometrical coupling between the different data types and also using said average properties, said geometrical coupling comprising shape and size of the lithology sub-regions, then determining uncertainty in boundaries of the lithology sub-regions.

9. A method for producing hydrocarbons from a subsurface region, comprising:

obtaining two or more data sets of different geophysical data types produced by surveys of the subsurface region;

jointly inverting the two or more data sets to obtain a model of at least one geological property for the subsurface region, using a method of claim 1;

using the model in determining where to drill a well into the subsurface region; and drilling the well and producing hydrocarbons from it.

10. A computer-implemented method for joint inversion of two or more sets of geophysical data of different types, measured in surveys of a subsurface region, to obtain a model of at least one geological property for the subsurface region, said method comprising:

using a computer to jointly invert the sets of geophysical data, using structural coupling between the different data types, to obtain models of geophysical properties corresponding to the sets of geophysical data, said structural coupling being determined from the geophysical data or from a priori knowledge of the subsurface region;

partitioning the subsurface region into sub-regions based on similar combinations of geophysical parameters in the geophysical property models that correlate to particular lithologies, thereby defining lithology sub-regions;

determining mathematical rock physics relationships appropriate for each lithology, said rock physics relationships relating geological properties to geophysical properties; and using a computer to jointly invert the sets of geophysical data, using the rock physics relationships according to lithology sub-region, to obtain a model of one or more of the geological properties for the subsurface region, wherein the using the computer to jointly invert includes simulating synthetic data for each data type using an initial model of a corresponding geophysical property, then determining a misfit between synthetic data and corresponding measured data, then using the misfit to adjust the initial model, then iterating beginning with the simulating synthetic data until the misfit is less than a predetermined tolerance or other stopping condition is reached, wherein the using the misfit to adjust the initial model comprises selecting a mathematical objective function that includes a data misfit term for each data type multiplied by a weight for that data type and a term expressing the structural coupling.

11. The method of claim 10, wherein the term expressing the structural coupling comprises a cross-gradient constraint.

12. The method of claim 10, wherein the jointly inverting the sets of geophysical data using structural coupling further comprises in at least one iteration changing at least one of a group consisting of: type of structural coupling; frequency content of one or more data types; offsets for data types using multiple offsets, where "offset" is source-receiver spacing; time window used for time-domain data; spacing of discrete cells in a grid on which a model is expressed for purposes of inversion; data types used; and weights assigned to each data type.

13. The method of claim 10, wherein the jointly inverting the sets of geophysical data using the rock physics relationships further comprises in at least one iteration changing at least one of a group consisting of: frequency content of one or more data types; offsets for data types using multiple offsets, where "offset" is source-receiver spacing; time window used for time-domain data; spacing of discrete cells in a grid on which a model is expressed for purposes of inversion; data types used; and weights assigned to each data type.

14. A computer-implemented method for joint inversion of two or more sets of geophysical data of different types, measured in surveys of a subsurface region, to obtain a model of at least one geological property for the subsurface region, said method comprising:

using a computer to jointly invert the sets of geophysical data, using structural coupling between the different data types, to obtain models of geophysical properties corresponding to the sets of geophysical data, said structural coupling being determined from the geophysical data or from a priori knowledge of the subsurface region;

partitioning the subsurface region into sub-regions based on similar combinations of geophysical parameters in the geophysical property models that correlate to particular lithologies, thereby defining lithology sub-regions;

determining mathematical rock physics relationships appropriate for each lithology, said rock physics relationships relating geological properties to geophysical properties; and using a computer to jointly invert the sets of geophysical data, using the rock physics relationships according to lithology sub-region, to obtain a model of one or more of the geological properties for the subsurface region, wherein an initial geological properties model for the joint inversion using rock physics relationships is developed by performing a joint inversion of the sets of geophysical data, using geometrical coupling between the different data types, to infer average values for the geophysical properties over each lithology sub-region and also at least one geometrical property of the subsurface region common to all of the sets of geophysical data, then using the average geophysical properties and the at least one geometrical property combined with the rock physics relationships to develop the initial geological properties model.

15. The method of claim 14, wherein the at least one geometrical property is selected from a group consisting of depth to at least one of the lithology sub-regions, and thickness of at least one of the lithology sub-regions.

* * * * *